United States Patent

[11] 3,542,135

[72] Inventor James E. McCanse
Oregon, Illinois
[21] Appl. No. 725,657
[22] Filed May 1, 1968
[45] Patented Nov. 24, 1970
[73] Assignee Wood Brothers Incorporated,
Oregon, Illinois
a corporation of Delaware.

[54] IMPLEMENT WITH TAIL WHEEL SUPPORT
8 Claims, 4 Drawing Figs.
[52] U.S. Cl. ............................................. 172/319,
172/445, 280/414.5
[51] Int. Cl. ................................................ A01b 63/14
[50] Field of Search ....................................... 172/316,
318, 319, 445, 491, 657; 280/414.5, 406

[56] References Cited
UNITED STATES PATENTS
| | | | |
|---|---|---|---|
| Re. 22,932 | 11/1947 | Acton | 172/316 |
| 3,174,557 | 3/1965 | Newkirk | 172/319 |
| 3,235,286 | 2/1966 | Meadowcroft | 172/449X |
| 3,306,369 | 2/1967 | Brewer | 172/319X |
| 3,321,031 | 5/1967 | Evans | 172/657 |
| 3,336,049 | 8/1967 | Cayton | 280/414.5 |

Primary Examiner—Robert E. Pulfrey
Assistant Examiner—James W. Peterson
Attorney—Wolfe, Hubbard, Leydig, Voit & Osann ABSTRACT: An agricultural implement adapted for connection to the three-point hitch of a tractor includes a pivotally mounted tail wheel connected to the upper stabilizer link of the hitch by a linkage mechanism which responds to upward movement of the stabilizer link to lower the tail wheel relative to the implement in such a way that the tail wheel jacks up the rear end of the implement as the front end thereof is lifted by the hitch. A hydraulic actuator connected to the implement exerts a substantial force on the linkage mechanism in a direction tending to lower the tail wheel relative to the implement and relieving the tension in the stabilizer link thereby reducing the load imposed on the hitch and the rear tractor wheels and increasing the load imposed on the tail wheel and the front tractor wheels to improve the stability and increase the lift capacity of the tractor.

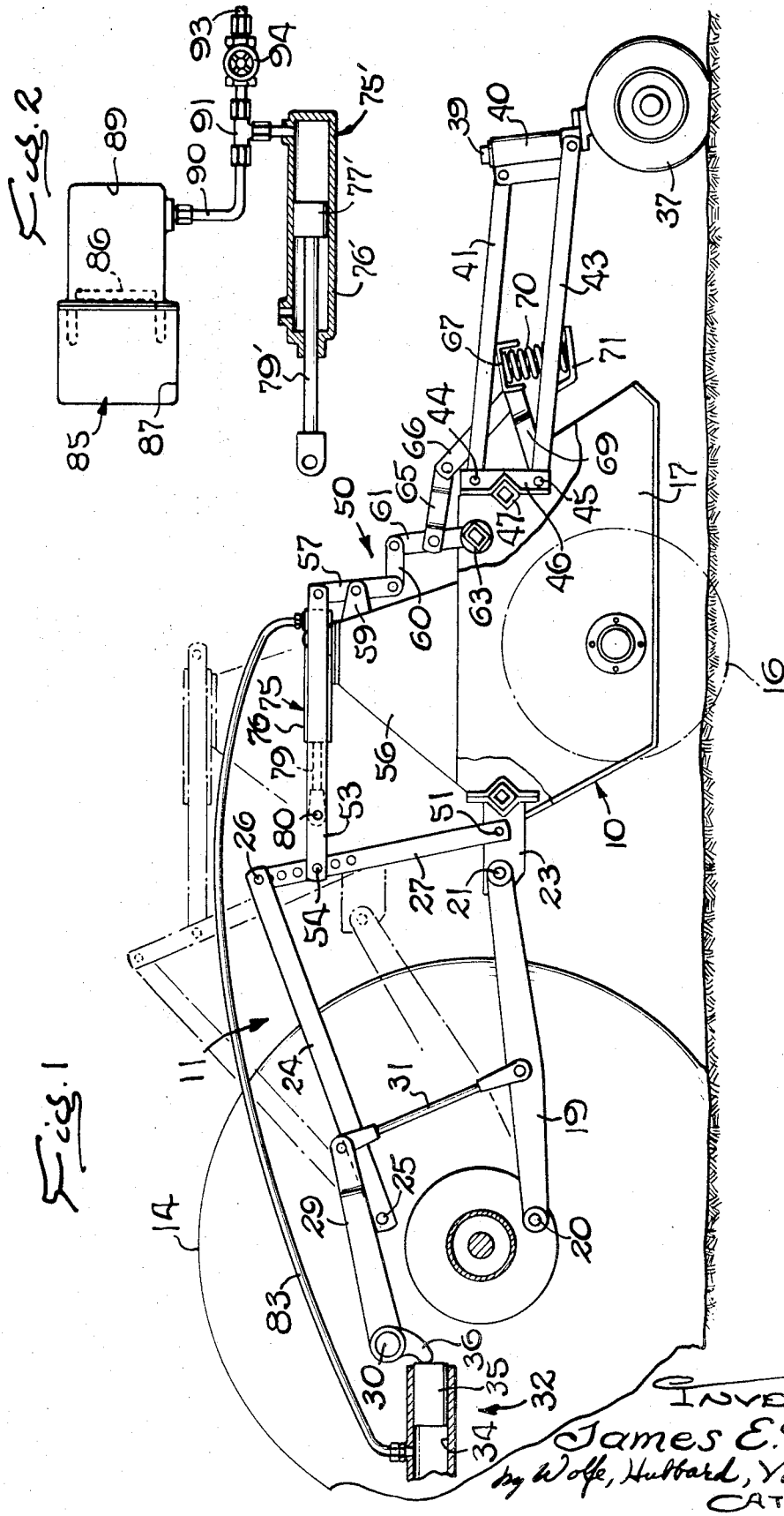

Patented Nov. 24, 1970
3,542,135
Sheet 2 of 2
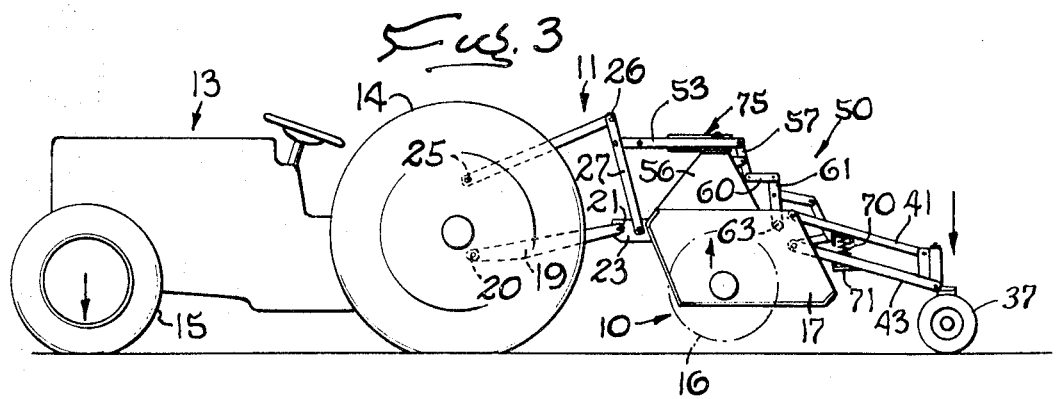
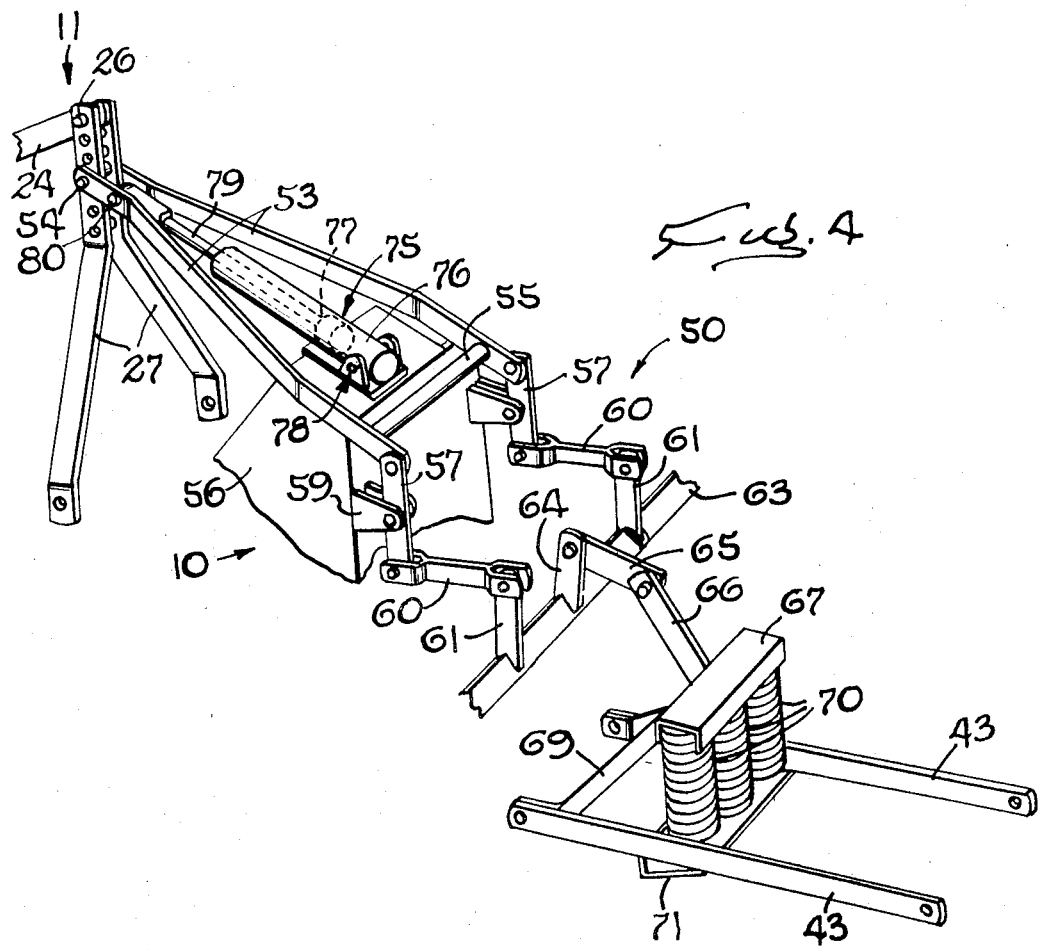
INVENTOR
James E. McCanse
by Wolfe, Hubbard, Voit & Osann
ATTORNEY 3,542,135

IMPLEMENT WITH TAIL WHEEL SUPPORT

BACKGROUND OF THE INVENTION

This invention relates to an agricultural implement of the type adapted to be connected to the three-point hitch of a tractor and moved between working and raised positions as the hitch is raised and lowered. More particularly, the invention relates to an implement such as disclosed in U.S. Pat. No. 3,306,369 wherein a ground-engaging tail wheel is mounted pivotally on the rear of the implement to share the weight or load of the implement with the hitch and is connected to the upper link of the hitch by a linkage mechanism which responds to movement of the upper link in one direction to move the tail wheel relative to the implement in the opposite direction. With such an arrangement, the tail wheel is lowered with respect to the implement as the hitch is raised and helps jack up the implement to keep part of the load off of the hitch and the rear wheels of the tractor regardless of the elevation of the implement.

SUMMARY OF THE INVENTION

The present invention aims primarily to provide an implement of the above character in which the loading on the rear tractor wheels and the hitch is reduced to a much greater degree than has been possible with prior arrangements so that the tractor not only may be operated with greater stability but also will be capable of lifting heavier implements. For these purposes, provision is made of a force applicator connected to the linkage mechanism for exerting a substantial force on the tail wheel and the upper hitch link to urge the tail wheel downwardly independently of the weight of the implement and, at the same time, to relieve the tension in the upper hitch link. In this way, the loading on the hitch and the rear tractor wheels is decreased while the loading on the tail wheel and the front tractor wheels is increased thus reducing the tendency of the tractor to rear upwardly and permitting the hitch to lift much heavier implements.

In the preferred form of the invention, the force applicator is operated hydraulically and is advantageously connected directly into the same hydraulic stem of the hydraulic actuator used for rising the hitch in order to simplify the installation and lower the cost of the force applicator and to keep the force exerted on the tail wheel and the upper link substantially proportional to the lifting force applied to the hitch. The invention also resides in the novel arrangement of a modified force applicator which is especially suitable for use with those tractors in which the hydraulic system of the hitch actuator is not readily accessible for connection to the force applicator.

Other objects and advantages of the invention will become apparent from the following detailed description taken in conjunction with the accompanying drawings.

BRIEF DESCRIPTION OF THE DRAWINGS

FIG. 1 is a fragmentary side elevation of a tractor and a new and improved implement embodying the novel features of the present invention, parts of the tractor and implement being broken away and shown in section.

FIG. 2 is a schematic view of the modified force applicator.

FIG. 3 is a reduced view similar to FIG. 1 but showing the implement in a raised position.

FIG. 4 is a fragmentary perspective view of the force applicator and of parts of the hitch and linkage mechanism.

DESCRIPTION OF THE PREFERRED EMBODIMENTS

As shown in the drawings for purposes of illustration, the invention is embodied in an agricultural implement 10 movable along the ground to perform an earth or crop working operation and connected to the three-point hitch 11 of a tractor 13 (FIG. 3) having large rear traction wheels 14 and one or more steerable front wheels 15. Herein, the implement is illustrated specifically as being a cultivating tiller having a bladed rotor 16 journaled to turn about a horizontal axis within a shroud 17 and power-rotated in a counterclockwise direction into working engagement with the soil by a drive train (not shown) connected to the power take-off of the tractor.

The hitch 11 is designed conventionally to raise and lower the implement 10 between working and raised positions as shown in FIGS. 1 and 3, respectively, and includes a pair of vertically swingable lower lift links 19 whose forward ends are connected pivotally at 20 (FIG. 1) to the rear of the tractor 13 and whose rear ends are pivoted detachably at 21 to brackets 23 projecting forwardly from the forward end of the implement shroud 17. A vertically swingable upper stabilizer link 24 is pivoted at its forward end to the tractor at 25 and is connected pivotally at its rear end by a coupling pin 26 to an A-shaped mast 27 upstanding from the forward end of the implement and fastened to the brackets 23. As the front end of the implement is raised by the lift links 19, the stabilizer link 24 swings upwardly about the pivot 25 and causes raising of the rear end of the implement.

To raise and lower the hitch 11 and the implement 10, two rocker arms 29 (FIG. 1) fast on a rockshaft 30 on the rear of the tractor 13 are coupled to the lift links 19 by connecting links 31 and are adapted to be rocked upwardly and downwardly under the control of a hydraulic actuator 32 carried by the tractor and energized by the fluid activating system of the tractor. The actuator includes a cylinder 34 slidably receiving a piston 35 which moves rearwardly in engagement with a crank 36 on the rockshaft to turn the latter counterclockwise and raise the lift links 19 and the implement 10 as hydraulic oil is admitted into the cylinder at pressures normally ranging between 1500 and 3000 p.s.i. When the oil is dumped from the cylinder, the weight of the implement rocks the crank 36 clockwise to force the piston forwardly and permit lowering of the links and the implement. As is conventional, oil is metered into and out of the cylinder automatically during the time the implement is working the soil so as to raise and lower the implement according to the conditions of the soil and to lift the implement abruptly in case an obstruction is encountered.

Part of the weight of the implement 10 is borne by at least one tail wheel 37 connected to the rear end of the implement near the transverse center thereof for up and down movement relative to the implement. In this instance, the tail wheel is carried at the lower end of a spindle 39 (FIG. 1) which is castered in a bearing housing 40 coupled to the implement by pairs of upper and lower parallel bars 41 and 43 connected pivotally at their rear ends to the bearing housing. At their forward ends, the upper and lower pairs of bars are connected pivotally by pins 44 and 45, respectively, to a bracket 46 fastened to the midpoint of a tool bar 47 extending along the rear of the shroud 17. Through a linkage mechanism 50 extending fore and aft of the implement to the stabilizer link 24 the tail wheel is lowered relative to the implement in response to upward swinging of the stabilizer link about the pivot 25 during lifting of the implement and is raised with respect to the implement as the stabilizer link is swing downwardly when the implement is lowered. As a result, the tail wheel helps jack up the implement as the latter is raised by the hitch 11 and continues to share the weight of the implement with the lower lift links 19 irrespective of the elevation of the implement thereby to relieve some of the weight from the lift links and the rear tractor wheels 14.

In this specific instance, the mast 27 itself preferably but not necessarily forms part of the linkage mechanism 50, and, as shown most clearly in FIG. 1, is pivoted at 51 to the brackets 23 to swing forwardly and rearwardly relative to the implement 10 as the stabilizer link 24 is swung upwardly and downwardly during raising and lowering of the lift links 19. Forward movement of the mast is transmitted to the tail wheel 37 to lower the latter relative to the implement as the latter is lifted and, conversely, rearward movement of the mast is utilized to raise the tail wheel with respect to the implement as the implement is lowered into its working position.

For transmitting the movements of the mast 27 to the tail wheel 37, two links 53 (FIG. 4) are pivoted at their forward ends to the mast at 54 just below the coupling pin 26 and are tied together near their rear ends by a rod 55. The links 53 overlie a pedestal 56 on the upper side of the shroud 17 and are pivotally connected to the upper ends of a pair of levers 57 which are pivoted intermediate their ends to ears 59 projecting rearwardly from the rear side of the pedestal. At their lower ends, the levers 57 are connected pivotally to rearwardly extending connecter links 60 which, in turn, are pivoted to the upper ends of crank arms 61 rigid with and upstanding from a rod 63 extending along the rear of the shroud and journaled to rock about its own axis as the levers 57 are rocked on the ears 59. A third upstanding crank arm 64 is anchored to the rods 63 between the arms 61 and is connected by a pivoted link 65 to an arm 66 which is rigid with a spring bracket 67 underlying the upper bars 41 connected to the tail wheel 37. The spring bracket is free to move relative to the upper bars and is formed with a forwardly and downwardly inclined yoke 69 which is pivoted at its forward end to the rear end of the implement 10 by the same pivot pins 45 used to fasten the lower bars 43 to the implement. Three relatively heavy coil springs 70 are compressed between the lower side of the spring bracket 67 and the upper side of a plate 71 rigid with and extending between the lower bars 43. The springs cushion the tail wheel and allow the latter to float to some degree independently of the linkage mechanism 50, this being particularly advantageous when the implement is being turned around at the ends of the rows of the fields and is being moved crosswise of the rows.

As the lift inks 19 are raised to lift the implement 10, the stabilizer link 24 swings upwardly about the pivot 25 to swing the mast 27 forwardly about the pivots 51 and thus pull the links 53 forwardly. The forward motion of the links causes the levers 57 to rock counterclockwise about the ears 59 to force the links 60 rearwardly and rock the bar 63 in a clockwise direction. Through the link 65 and the arm 66, the spring bracket 67 is forced to swing downwardly about the pivot pins 45 and forces the springs 70 downwardly against the plate 71 thus causing the bars 43 to swing downwardly about the pivot pins 45 to lower the tail wheel 37 relative to the implement. Accordingly, the rear end of the implement is jacked upwardly by the tail wheel as the front end is raised by the lift links 19 and, as a result, the tail wheel continues to share the weight of the implement as the latter is raised so that the entire weight of the implement is not placed on the hitch 11 and the rear wheels 14 of the tractor 13. When the lift links are lowered, the resulting downward movement of the stabilizer link 24 is transmitted to the tail wheel through the linkage mechanism 50 to raise the tail wheel gradually relative to the implement as the forward end of the implement is lowered. The tail wheel thus relieves some of the load on the rear tractor wheels and the hitch in both the working and raised positions of the implement.

In accordance with the present invention, the lifting capacity of the hitch 11 is increased and the stability and steering control of the tractor 13 are improved by reducing the loading on the hitch and the rear tractor wheels 14 to a substantially greater extent than is possible through the use of the linkage mechanism 50 and the tail wheel 37 alone. To these ends, a substantial external force is applied to the linkage mechanism in a direction urging the tail wheel downwardly and relieving the loading imposed on the stabilizer link 24 by the weight of the implement. As a result, a positive downward force tending to jack the implement upwardly is exerted on the tail wheel to place more of the weight of the implement on the tail wheel and, at the same time, part of the loading otherwise normally removed from the front tractor wheels 15 by the weight of the implement is restored so as to help keep the front wheels under load. Accordingly, the loading on the rear tractor wheels and the hitch is decreased and the loading on the front tractor wheels and the tail wheel is increased so that heavier implements can be carried and lifted by a hitch of given capacity while maintaining a sufficient downward force on the front end of the tractor to prevent the latter from rearing upwardly and becoming difficult to control and steer.

Herein, the force is exerted on the linkage mechanism 50 by a force applicator 75 which preferably is in the form of a reciprocating hydraulic actuator. As shown in FIG. 4, the actuator 75 includes a cylinder 76 pivotally connected at 78 to the upper side of the pedestal 56 between the links 53 and slidably receiving a piston 77 which carries a plunger or rod 79. The latter is fastened pivotally at its free end to the forward end portions of the links by a pin 80 extending through the links and the rod.

In response to the admission of hydraulic oil into the rear end of the cylinder 76, the piston 77 and the rod 79 are urged forwardly to exert a forwardly directed force on the mast 27 through the links 53. Such force tends to swing the mast forwardly about the pivots 51 and is transmitted through the coupling pin 26 to the stabilizer link 24 to relieve some of the tension normally placed in the link as a result of the implement hanging on the link. Accordingly, the clockwise turning movement exerted about the rear wheels of the tractor by the weight of the implement is reduced so that less weight is imposed on the rear tractor wheels and more load remains on the front tractor wheels 15 to enable better control of the steering of the tractor and to reduce the tendency of the tractor to rear upwardly. In some positions of the implement, the force exerted by the actuator 75 actually places the stabilizer link in compression and imposes a counterclockwise turning moment on the tractor through the stabilizer link and the pivot 25 to urge the front tractor wheels downwardly with a positive force and thereby increase still further the loading on the front wheels.

In addition, the force exerted by the hydraulic actuator 75 continuously urges the tail wheel 37 downwardly to increase significantly the loading on the tail wheel and reduce the loading on the rear tractor wheels 14. When the cylinder 76 is pressurized, the links 53 are urged forwardly thereby tending to lower the tail wheel relative to the implement 10 with a positive downward force. The force applied by the actuator thus is exerted on the tail wheel in a direction tending to jack up the implement so that more load is imposed on the tail wheel and less load is imposed on the rear tractor wheels and the lift links 19. As an end result, the stability of the tractor is improved and heavier implements may be raised by the lift links.

It should be noted that the actuator 75 does not actually change the position of the stabilizer link 24 or the tail wheel 37 but simply exerts continuous forces on the two to make the implement 10 easier to lift and to relieve the loading on the rear tractor wheels 14. That is, the force exerted by the actuator in a forward direction is opposed by the stabilizer link bearing against the tractor and the force exerted in the rearward direction is opposed by the tail wheel bearing against the ground such that the parts are subjected to increased loading but do not change positions.

Preferably, the force actuator 75 is connected into the fluid activating system of the tractor in parallel relation with the hydraulic actuator 32 for raising the lift links 19 and is energized with oil at a pressure correlated with that of the oil supplied to the actuator 32 in order to simplify the installation and lower the cost of the force actuator 75 and to keep the force exerted by such actuator proportional to the lifting force imposed on the links 19 by the actuator 32. For this purpose, a flow conduit or hose 83 (FIG. 1) is connected between the forward side of the cylinder 34 and the rear side of the cylinder 76 such that the pressure of the oil supplied through the hose to the cylinder 76 to create the force on the stabilizer link 24 and the tail wheel 37 is the same as the pressure of the oil admitted into The cylinder 34 to raise the lift links. With this arrangement, the force exerted by the actuator 75 increases during raising of the implement 10 when such force is most needed and then decreases when the implement is lowered thereby to insure against the relieving of too much of the load from the rear tractor wheels 14. In addition, it is a relatively simple matter to connect the force actuator 75 to the actuator 32 and only a single hose is required to effect the installation.

A modified force actuator 75' for use with those types of tractors in which the hydraulic actuator 32 is not easily accessible is shown schematically in FIG. 2 wherein parts corresponding to those of the actuator 75 of the first embodiment are indicated by the same but primed reference numerals. As before, the cylinder 76' is pivoted to the top of the pedestal 56 on the implement 10 and the rod 79' is connected pivotally to the coupling pin 80 between the links 53 but, in this instance, the cylinder 76' is pressurized by oil in an accumulator 85 rather than being connected to the lift actuator 32. The accumulator is carried on the implement adjacent the force actuator 75' and herein comprises a cylindrical tank within which is slidable a piston 86 serving to divide the tank into two compartments 87 and 89. A pipe 90 leading from the compartment 89 is connected to the rear side of the cylinder 76' by a tee 91 which also connects the cylinder and the compartment to a line 93 adapted to be connected to the conventional remote work port of the fluid activating system of the tractor.

The cylinder 76' is charged to a pressure ranging between 1500 and 3000 p.s.i. by introducing hydraulic oil from the tractor system through the line 93 and into the tee 91. At the same time, the oil flows through the pipe 90 and into the compartment 89 of the tank 85 to force the piston 86 from right to left as viewed in FIG. 2. The tank is installed on the implement with the compartment 87 precharged with a gas such as nitrogen at a pressure of about 1200 p.s.i. and thus the gas is compressed as the piston is shifted in the tank by the oil flowing into the compartment 89.

After the compartment 89 and the cylinder 75' have been charged fully with oil at a pressure equal to that of the tractor system, the flow through the line 93 is terminated, either by closing a valve 94 (FIG. 2) in the line or by stopping the flow into the line through manipulation of the valve lever (not shown) on the tractor. Thereafter, no flow exists between the tractor system and the cylinder 76', but instead, the pressurized gas in the compartment 87 keeps the oil in the cylinder under pressure and causes the exertion of a substantial force on the stabilizer link 24 and the tail wheel 37. As the mast 27 is swung forwardly and rearwardly during raising and lowering of the implement, oil flows back and forth from the tank to the cylinder as the rod 79' is extended and retracted, the gas being compressed to allow oil to flow into the compartment as the mast swings rearwardly and then expending to return the oil into the cylinder when the mast swings forwardly. In this way, the actuator exerts a continuous force on the stabilizer link and the tail wheel through the mast and the links 53 so as to relieve the loading on the rear wheels 14 of the tractor 13. When it is desired to unhitch the implement, the valve 94 is opened to relieve the pressure in the cylinder so that the coupling pin 26 between the mast and the stabilizer link may be removed.

From the foregoing, it will be apparent that the use of the force applicators 75, 75' in conjunction with the tail wheel 37 and the linkage mechanism 50 significantly reduces the loading on the rear wheels 14 of the tractor 13 thus making the tractor more stable and capable of operating at higher speeds and with heavier implements. While the implement has been illustrated specifically with only a single tail wheel, it will be apparent to those skilled in the art that two or more tail wheels could be attached to the rear of the implement and shifted simultaneously by the linkage mechanism.

I claim:

1. An implement for use with a tractor having rear wheels and at least one front wheel and having a three-point hitch including a vertically swingable upper stabilizer link and a pair of vertically swingable lower lift links connected to be raised and lowered by a reciprocating hydraulic actuator as pressure fluid is delivered to and dumped from the actuator, said implement having forward and rear ends and being connected pivotally at its forward end to the lift links, an upstanding mast connected pivotally at its lower end to the forward end of the implement to swing forwardly and rearwardly about a horizontal axis as the stabilizer link is raised and lowered, a ground-engaging tail wheel connected pivotally to the rear end of said implement for up and down movement relative to the implement, a linkage extending fore and aft of the implement and connected at its rear end to said tail wheel, said linkage being connected at its forward end to said mast at an elevation above the pivotal connection of said mast to said implement and being operable to raise and lower the tail wheel relative to the implement in response to swinging of the mast forwardly and rearwardly as an incident to raising and lowering of the stabilizer link, a second reciprocating hydraulic actuator connected to said implement and energizable by pressure fluid to exert a substantial force on the linkage in a direction tending to swing the mast forwardly and relieve tension in the stabilizer link and tending to move the tail wheel downwardly relative to the implement thereby to increase the load on the tail wheel and the front wheel of the tractor and to decrease the load on the lift links and the rear wheels of the tractor, and conduit means connecting said first and second actuators for conducting pressure fluid to the second actuator at a pressure proportional to the pressure of the pressure fluid energizing the first actuator and for automatically delivering pressure fluid to and dumping pressure fluid from said second actuator when pressure fluid is delivered to and dumped from said first actuator whereby the energization of said actuators is correlated at all times and said second actuator may reciprocate as necessary during swinging of said mast.

2. An implement as defined in claim 1 in which said second actuator comprises a cylinder member and a plunger member slidable in said cylinder member, one of said members being connected to said implement and the other of said members being connected to said mast to urge the latter forwardly in response to the admission of pressure fluid into said cylinder member.

3. An implement as defined in claim 2 in which said linkage includes a link extending fore and aft of the implement and connected pivotally at its forward end to said mast, a lever pivoted intermediate its ends on said implement and connected pivotally at its upper end to the rear end of said link, and means coupled between the lower end of said lever and said tail wheel to lower the latter as the link is shifted forwardly and to raise the tail wheel as the link is shifted rearwardly.

4. An implement for use with a tractor having rear wheels and at least one front wheel and having a three-point hitch including a vertically swingable upper stabilizer link and a pair of vertically swingable lower lift links connected to be raised and lowered by a hydraulic actuator as pressure fluid is delivered to and dumped from the actuator, said implement having forward and rear ends and being connected pivotally at its forward end to the lift links, a ground-engaging tail wheel connected to the rear end of said implement for up and down movement relative to the implement, linkage mechanism connected pivotally between the tail wheel and the stabilizer link and responsive to swinging of the latter in one direction to move the tail wheel in the opposite direction a second hydraulic actuator connected to said implement and energizable by pressure fluid to exert a substantial force on the linkage mechanism in a direction tending to relieve tension in the stabilizer link and tending to move the tail wheel downwardly relative to the implement thereby to reduce the load on the lift links and the rear tractor wheels and to increase the load on the tail wheel and the front tractor wheel, said second actuator being of the reciprocating type and lengthening and shortening as the stabilizer link is swung vertically in opposite directions, and conduit means connecting said first and second actuators for conducting pressure fluid to the second actuator at a pressure proportional to the pressure of the pressure fluid energizing the first actuator and for automatically delivering pressure fluid to and dumping pressure fluid from said second actuator when pressure fluid is delivered to and dumped from said first actuator whereby the energization of said actuators is correlated at all times and said second actuator may lengthen and shorten as necessary during vertical swinging of said stabilizer link.

5. For use with a tractor having a three-point hitch including a pair of vertically swingable lower lift links and a vertically swingable upper stabilizer link, and implement having forward and rear ends and connected pivotally at its forward end to the lift links, an upstanding mast connected pivotally at its upper end to the stabilizer link and connected pivotally at its lower end to the forward end of the implement to swing forwardly and rearwardly about a horizontal axis as the stabilizer link is raised and lowered, a ground-engaging tail wheel connected pivotally to the rear end of said implement for up and down movement relative to the implement, a linkage extending fore and aft of the implement and connected at its rear end to said tail wheel, said linkage being connected at its forward end to said mast at an elevation above the pivotal connection of said mast to said implement and being responsive to swinging of the mast forwardly to lower and rearwardly to raise the tail wheel through a distance correlated with the distance through which the stabilizer link is raised and lowered to swing the mast, a fluid-operated actuator carried on said implement and connected to said linkage and operable when pressurized to exert a substantial force on the linkage in a direction tending to swing the mast forwardly and relieve tension in the stabilizer link and tending to move said tail wheel downwardly relative to the implement, said actuator being of the reciprocating type and lengthening and shortening during swinging of the mast, and means for automatically delivering pressure fluid to and dumping pressure fluid from said actuator in response to swinging of said mast whereby the actuator may lengthen and shorten as necessary during such swinging.

6. For use with a tractor having rear wheels and at least one front wheel and having a three-point hitch including a pair of vertically swingable lower lift links and a vertically swingable upper stabilizer link, an implement having forward and rear ends and connected pivotally at its forward end to the lift links, a mast upstanding from the forward end of said implement, a coupling pivotally connecting said mast and the stabilizer link a ground-engaging tail wheel connected pivotally to the rear end of said implement for up and down movement relative to the implement, a linkage extending fore and aft of the implement and connected to said tail wheel, said linkage being connected to the stabilizer link through said coupling and being responsive to swinging of the stabilizer link in one direction to move the tail wheel in the opposite direction, a reciprocating fluid-operated actuator carried on said implement and connected to said linkage and operable when pressurized to exert a substantial force on the linkage in a direction tending to relieve tension in the stabilizer link and tending to move said tail wheel downwardly thereby to increase the load on the tail wheel and the front tractor wheel and to reduce the load on the rear tractor wheels, said actuator being of the reciprocating type and being connected between said implement and said linkage to lengthen and shorten during vertical swinging of said stabilizer link, and means for automatically delivering pressure fluid to said actuator and enabling the automatic dumping of pressure fluid from said actuator in response to swinging of said stabilizer link whereby the actuator may lengthen and shorten as necessary during such swinging.

7. An implement as defined in claim 6 in which the lift links are connected to be raised and lowered by a fluid-operated actuator on the tractor as pressure fluid is delivered to and dumped from such actuator, said means comprising a conduit connecting the two actuators.

8. An implement as defined in claim 6 in which said actuator comprises a cylinder and a plunger slidable back and forth relative to the cylinder in response to the flow of hydraulic oil into and out of the cylinder, said means comprising an accumulator containing a charge of gas under pressure and adapted to hold a supply of hydraulic oil, and a conduit connected between said accumulator and said cylinder for conducting a flow of oil back and forth between the cylinder and the accumulator as the stabilizer link is raised and lowered.